United States Patent [19]

Kobayashi et al.

[11] Patent Number: 4,777,340
[45] Date of Patent: Oct. 11, 1988

[54] WIRE ELECTRICAL DISCHARGE MACHINING APPARATUS

[75] Inventors: Minoru Kobayashi, Hyogo; Seiichi Tanahashi; Masaru Shinkai, both of Aichi, all of Japan

[73] Assignee: Mitsubishi Denki Kabushiki Kaisha, Tokyo, Japan

[21] Appl. No.: 102,218

[22] Filed: Sep. 29, 1987

[30] Foreign Application Priority Data

Sep. 29, 1986 [JP] Japan .............................. 61-230871

[51] Int. Cl.$^4$ .......................... B23H 1/00; B23H 7/02
[52] U.S. Cl. .............................. 219/69 W; 204/297 R; 219/69 R; 428/677
[58] Field of Search ................ 219/69 R, 69 G, 69 E, 219/69 W, 69 V, 69 D, 69 M; 51/240 R; 204/129.1, 224 M, 297 R; 428/627

[56] References Cited

U.S. PATENT DOCUMENTS

| | | | |
|---|---|---|---|
| 3,282,746 | 11/1966 | Zlotek et al. | 428/627 |
| 3,469,058 | 9/1969 | O'Connor | 219/69 V |
| 3,772,058 | 11/1973 | Bloom | 428/627 |
| 4,084,074 | 4/1978 | Gilleland et al. | 219/69 W |
| 4,339,650 | 7/1982 | Tanaka et al. | 219/69 W |
| 4,517,217 | 5/1985 | Hoffman | 428/627 |
| 4,557,981 | 12/1985 | Bergmann | 428/627 |
| 4,625,085 | 11/1986 | Yoshida et al. | 200/19 R |

*Primary Examiner*—M. H. Paschall
*Assistant Examiner*—Geoffrey S. Evans
*Attorney, Agent, or Firm*—Sughrue, Mion, Zinn, Macpeak, and Seas

[57] ABSTRACT

A wire electrical discharge machining apparatus which cuts to a desired shape a workpiece placed on a workpiece table, using a discharge phenomenon occurring between the workpiece and a wire electrode opposite to the workpiece with a machining fluid in a space therebetween, characterized in that the workpiece table is made of cast iron having a coefficient of thermal expansion of less than $6 \times 10^{-6}/°C$. and that a surface layer is provided on the workpiece table on which a workpiece is placed, the surface layer having corrosion resistance to the machining fluid and having a hardness higher than that of the material constituting the workpiece table.

11 Claims, 6 Drawing Sheets

WIRE ELECTRICAL DISCHARGE MACHINING APPARATUS

BACKGROUND OF THE INVENTION

This invention relates to a wire electrical discharge machining apparatus which cuts a workpiece by using a discharge phenomenon.

FIG. 6 is a perspective view showing a conventional wire discharge machining apparatus disclosed in Published Examined Utility Model Application No. 37544/1983. In FIG. 6, reference numeral 1 denotes a bed; 2, an X-Y cross table resting on the bed 1; 3, a workpiece; 4, a gate type column; 5 an upper arm; 6, a lower arm; 7, an upper guide; 8, a lower guide; 9, a storage drum for a wire electrode 12; 10, a tension applying device including a brake drum and a pinch roller; 11, a drawing-out and moving device having a capstan and pinch roller which draws out and moves the wire electrode 12; 13, an electrode head provided on a substantially the central top of the gate type column 4; and 14, a support for the workpiece 3 combined with the X-Y cross table 2.

The operation of the thus constructed conventional apparatus will be described. A gate type column section 4a is a single structure having the shape of a largely curved bow whose ends are provided with corresponding legs 4b connected integrally with the bed 1 and disposed on a base. The column portion 4a and legs 4b compose the gate type column 4. The electrode head 13 is fixed at substantially the center of the column portion 4a. The upper arm 5 is suspended from the head 13 or from the central top of the column portion 4a so that its vertical position is set freely. On the other hand, the lower arm 6 is provided so as to bridge the lower ends of the column portion 4a.

Under such arrangement, an electrical discharge removal process is performed between the workpiece 3 placed on the support plate 14 on the X-Y cross table 2 and the wire electrode 12 which is stretched and fed by the attractive force applying device 10 through a machining fluid therebetween.

It is said, according to the above structure, that the column portion 4a holding the upper and lower arms 5 and 6 is symmetrical in one axial direction with reference to the working shaft of the wire electrode 12, so that thermal equilibrium is maintained at least in one direction to reduce a deformation and/or deviation.

Since the conventional wire electrical discharge apparatus is constructed as just described above, the gate type column 4 necessarily large-sized, the need for the integral structure make it difficult to obtain the materials thereof and also makes machining difficult, which is a bottleneck in the manufacturing technique. The gate type column structure is also a bottleneck from the standpoint of a working space. Furthermore, the conventional apparatus only contemplates a deviation and movement of the wire electrode 12, but not a thermal deviation and movement of the workpiece 3, which is also important in order to ensure the machining accuracy. Namely, the support base 14 for the workpiece 3 is made of a stainless steel because of the need for corrosion resistance to the machining fluid. Although stainless steel has corrosion resistance, its coefficient of thermal expansion is about $17 \times 10^{-6}/°C.$, namely, large compared to that of a regular steel. Therefore, the workpiece 3 placed on the support base 14 is likely to deviate due to the thermal or temperature difference, so that the relative distance between the workpiece and the wire electrode varies to thereby result inevitably in a reduction of the machining accuracy.

The support base 14 for the workpiece 3 also has the problem that its surface will be highly damaged due to wear by the sliding of and shocks of the workpiece placed on the base. Generally, the workpiece 3 is often made of a tool steel or an ultra-high hard alloy. These high hard materials are especially likely to wear and damage the support base. Therefore, the workpiece on the support table 14 is difficult to rest horizontally, which brings about a noticeable reduction of the machining accuracy.

SUMMARY OF THE INVENTION

The present invention has been made to eliminate the above problems and its object is to provide a wire electrical discharge machining apparatus which is inexpensive and capable of performing high-accuracy machining.

According to the present invention, the workpiece table of the wire electrical discharge machining apparatus is made of cast iron having a coefficient of thermal expansion of less than $6 \times 10^{-6}/°C.$, and a surface of the workpiece table on which a workpiece is placed, is provided with a surface layer having corrosion resistance to the machining fluid and having a hardness higher than that of the material constituting the workpiece table.

The wire electrical discharge machining apparatus according to the present invention is made of a low expansion material having a coefficient of thermal expansion of less than $6 \times 10^{-6}/°C.$ so that thermal deviation is repressed, and is made of a casting so that the working steps are greatly reduced.

In addition, the surface of the workpiece table on which a workpiece is placed has thereon a surface layer which has corrosion resistance to the machining fluid and a hardness higher than that of the material composing the workpiece table to thereby improve its wear resistance.

DETAILED DESCRIPTION OF THE PREFERRED EMBODIMENTS

Figure 1:
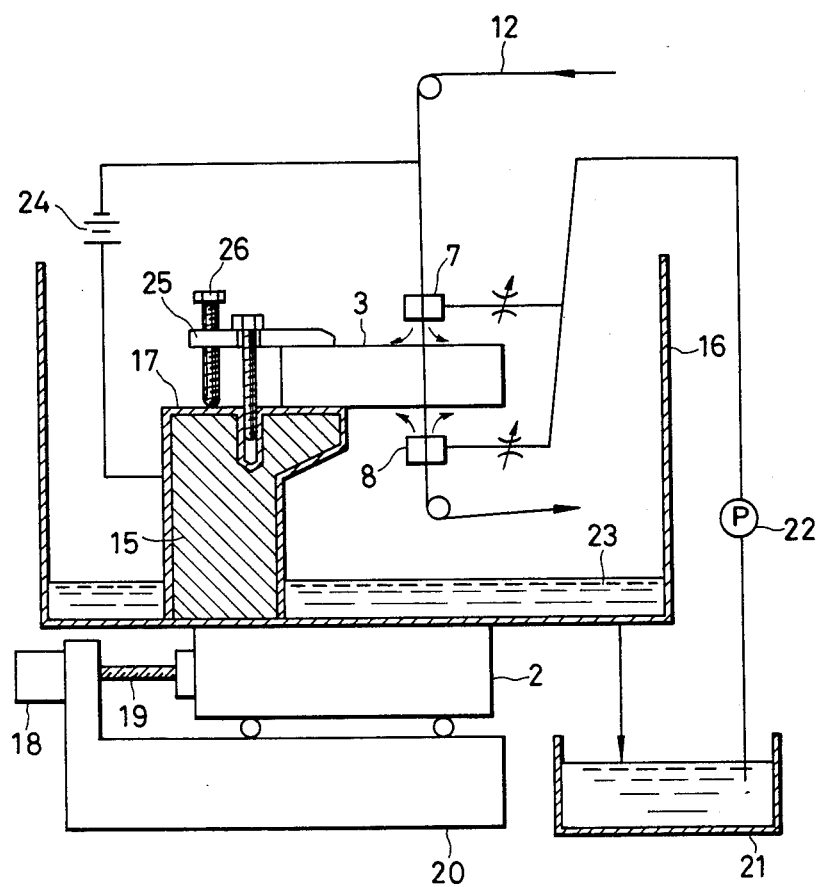
FIG. 1 is a cross-sectional view showing wire electrical discharge machining apparatus of one embodiment according to the present invention.

An embodiment of this invention will now be described with reference to the drawings. In FIG. 1, reference numeral 15 denotes a workpiece table on which a workpiece 3 is placed; 16, a working tank; 17, a surface layer provided on the workpiece table 15 and having corrosion resistance to the working fluid and a hardness higher than the workpiece table 16. Reference numeral 18 denotes a motor which drives the X-Y table 2, 19 a ball screw which transmits the power from the motor 18 to the table 2; 20, a bed which holds the motor 18 and supports the X-Y table 2 thereon; 21, a working fluid tank; 22, a feed pump which is fixed to the tank 21 and feeds a machining fluid 23 to the machining tank 16; 24, a working power source which supplies machining energy to the workpiece 3 via the wire electrode 12 and the workpiece table 15; and 25, a hold member which fixes the workpiece 3 to the table 15. Reference numeral 26 denotes a length adjusting bolt which adjusts the distance between the hold member 25 and the surface layer to the thickness of the workpiece 3.

The workpiece table 15 on which a workpiece 3 is placed is made of cast iron having a composition, for example, of 30–40% (% indicated a percent by weight) of Ni, 1–3% of C, 1–4% of Si, 10% or less of Co, 5% or less of Cr, 0.5 and or less of Cu, 1.5% or less of Mn and 1% or less of each of Mg, P, and S. Its coefficient of thermal expansion is $3-6 \times 10^{-6}/°C$. and its hardness is Hv 130 or so. This cast iron is hereinafter referred to as the low thermal expansion cast iron. It is to be noted that the coefficient of thermal expansion of the cast iron is minimum when 36% or so of Ni is contained.

It is desired from the standpoint of working accuracy that the workpiece table 15 has a coefficient of thermal expansion lower than the workpiece 3. Typical workpiece materials are a hard metal (coefficient of thermal expansion: $7 \times 10^{-6}/°C$.) and a tool steel (coefficient of thermal expansion: $8 \times 10^{-6}/°C$.).

The operation of the thus constructed apparatus will be described. A workpiece 3 is placed on the workpiece table 15 set in the working tank 16 and fixed by the hold member 25. The wire electrode 12 is then stretched between the upper and lower wire guides 7 and 8 under a tensile condition. Thereafter, a machining fluid 23 is fed from the machining fluid tank 21 into the machining tank 16 via the feed pump 22. An electrical discharge is then produced between the wire electrode 12 and the workpiece 3 using electrical energy supplied from the working power source 24 to melt the surface of the workpiece 3 opposite to the wire electrode 12. Shape cutting is performed by moving the X-Y table 2 in a plane on the bed 20 via the ball screw 19 under control of a rotational angle of the motor 18 by an NC device. At this time, the workpiece table 15 is made of low thermal expansion cast iron as mentioned above, so that little deviation of the workpiece table 15 which supports the workpiece 3 is caused even by a thermal change, inclusive of changes in the atmospheric temperature and/or room temperature to thereby ensure high-accuracy working. The surface layer 17 provided on the workpiece table 15 has a hardness higher than that of at least the workpiece table 15, so that the wear resistance and shock resistance of the workpiece table 15 are improved.

Here, an example of the compositions and physical characteristics of low expansion cast iron constituting the workpiece table are shown in Table 1.

The kinds of surface layers formed on the surface of the workpiece table on which a workpiece is mounted will now be described.

The surface layers which have a hardness higher than the materials constituting the workpiece table are:

(a) a plated layer made of a simple substance of any one of Ni, Cr and Co, or an alloy which mainly contains any one of Ni, Cr and Co;
(b) a surface layer of a composition of white pig iron;
(c) a modified surface of the workpiece table due to nitriding and/or boridation thereof;
(d) a coating layer of carbide, nitride, oxide or boride type ceramic.

First, the kinds of plating for the plated layers named at (a) and the hardness of the layers will be shown in Table 2.

TABLE 2

| Kinds of Plating | Hardness (Hv) |
| --- | --- |
| Cr-plating | 750–1000 |
| Cr-alloy plating (example, Cr—Mo) | 1340 |
| Ni-plating | 300 |
| Ni-alloy plating (for example, Ni—P) | 450 |
| Co-alloy plating (for example, Co—Mo) | 900 |

As is clear from Table 2, the respective plated layers named in Table 2 have enough hardness as a surface layer.

Figure 2:
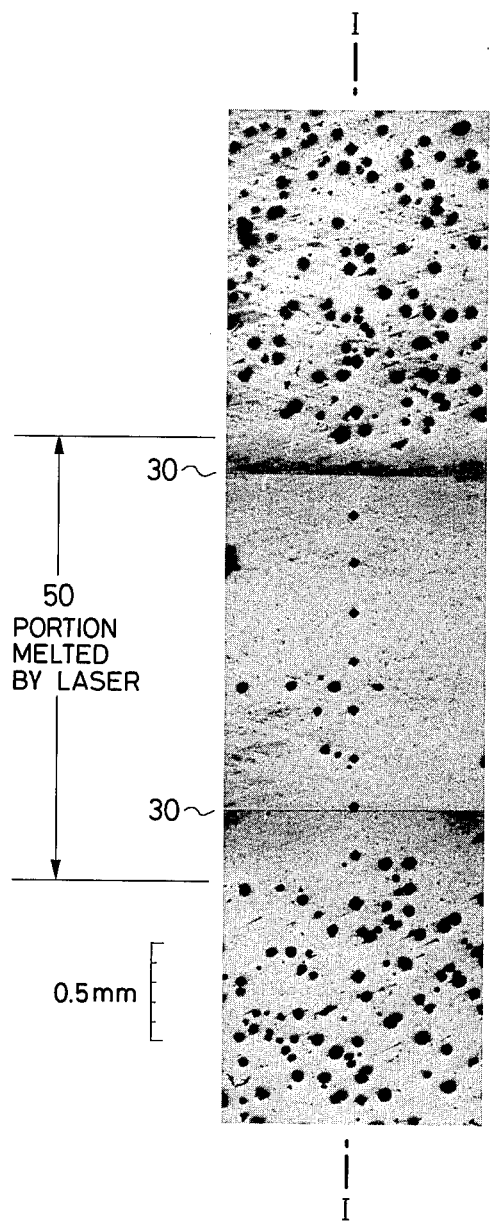
FIGS. 2 and 4 are photographs showing the metal organizations of the workpiece table surfaces which are changed to white pig iron, and are respectively embodiments of the present invention.
Figure 4:
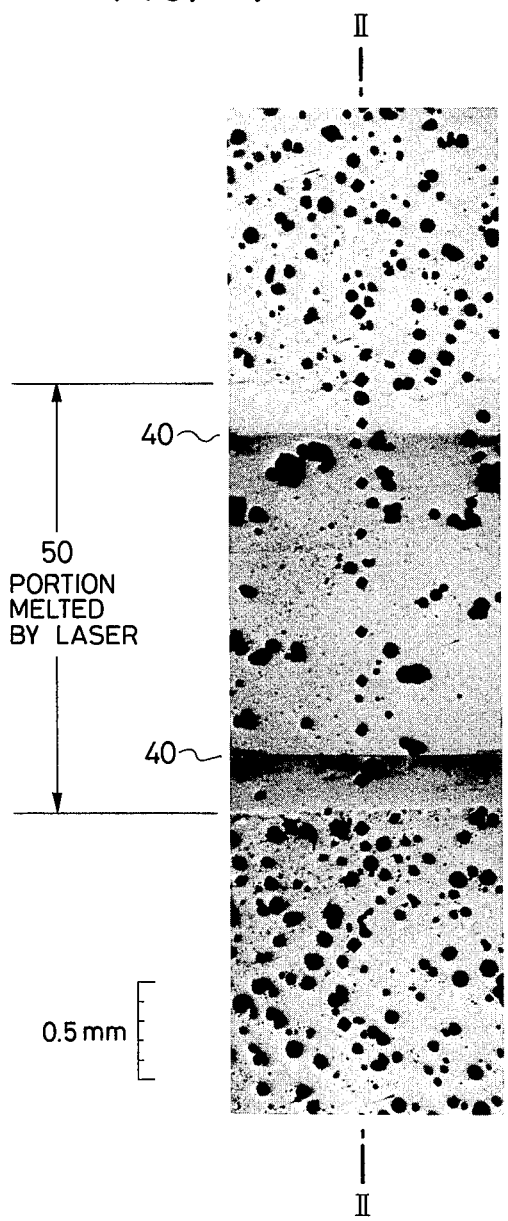

The composition of white pig iron named at (b) will now be described. FIGS. 2 and 4 are respectively the photographs of the surface composition, namely, whitened organization of the surface of low expansion cast iron obtained by irradiation of a $CO_2$ laser beam and rapid cooling and solidification of the iron surface. FIG. 2 is obtained when the $CO_2$ laser output is 1 KW and the scanning speed is at 0.5 m/min while FIG. 4 is obtained when the $CO_2$ laser output is 1 KW and the scanning speed is 1.0 m/min.

Figure 3:
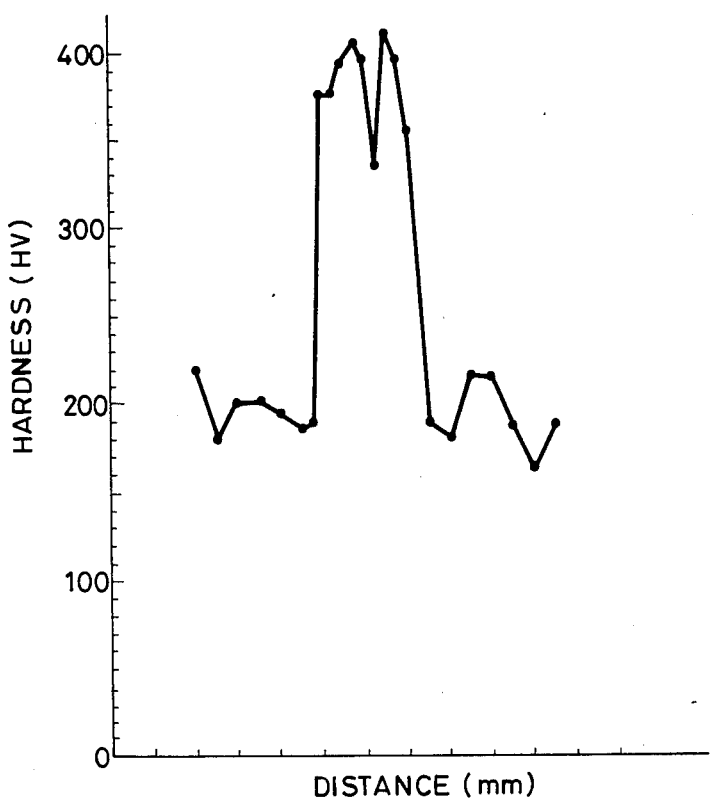
FIGS. 3 and 5 are characteristic diagrams showing the relationship between distance and hardness, which corresponds to FIGS. 2 and 4, respectively.
Figure 5:
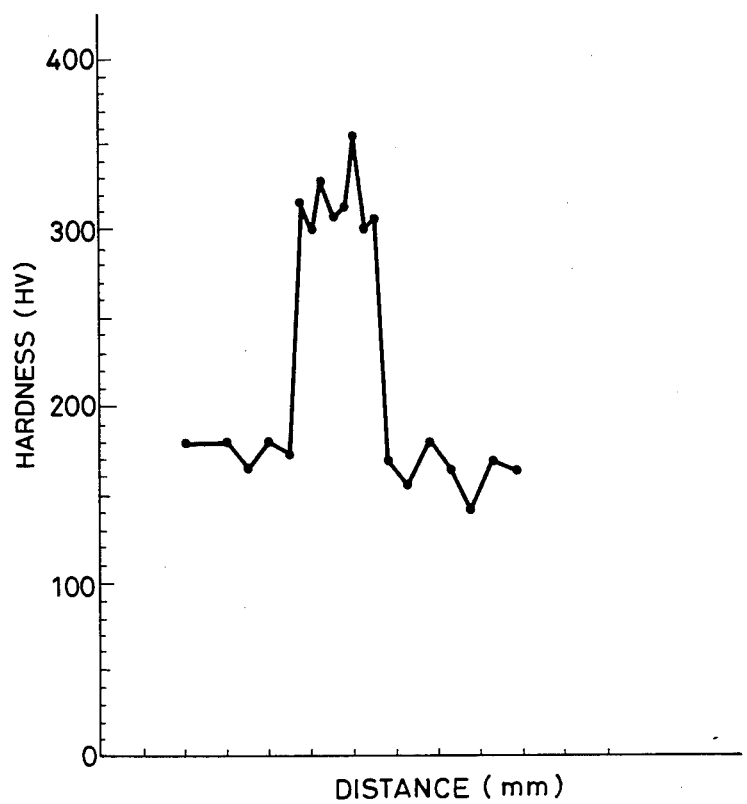
Figure 6:
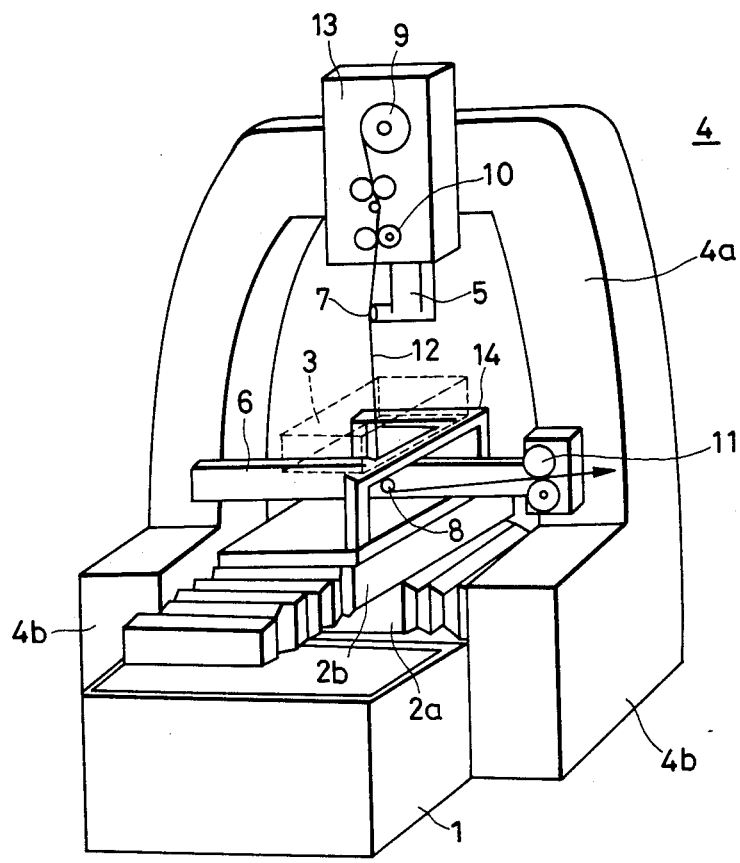
FIG. 6 is a perspective view showing a conventional wire electrical discharge machining apparatus.

In both FIGS. 2 and 4, rhombic dots on the line I—I and II—II show points where the hardnesses were measured. Reference numerals 30 and 40 each denote a line where adjacent photographs are joined. Reference numeral 50 denotes the melted portion by the laser. FIGS. 3 and 5 each are the characteristic diagrams showing the relationship between the distance and hardness of the surface composition and correspond to FIGS. 2 and 4. FIG. 3 is obtained when the $CO_2$ laser output is 1 KW, the scanning speed is 0.5 m/min, and the scanning width is 2.2 mm. FIG. 5 is obtained when the $CO_2$ laser output is 1 KW, the scanning speed 1 m/min, and the scanning width is 2.2 mm. As is clear from FIGS. 2–5, the non-white pig iron portions take the form of scattered graphite crystals while the organization of white pig iron includes a compound of graphite (carbon) and iron, so that it exhibits high hardness. Therefore, enough wear and shock resistance is ensured. The thickness of the white pig iron organization is 1 mm at most,

TABLE 1

| | C | Si | Mn | Ni | Cr | Cu | P | Co | Mg | S | Coefficient of Thermal Expansion | Hardness (Hv) |
| --- | --- | --- | --- | --- | --- | --- | --- | --- | --- | --- | --- | --- |
| 1 | ≦2.4 | 1–2 | 0.5–1.5 | 34–36 | ≦0.1 | ≦0.5 | ≦0.01 | ≦0.01 | ≦0.01 | 0.01 | $3.0-5.0 \times 10^{-6}/°C$. | 108–130 |
| 2 | ≦2.4 | 1.0–2.8 | ≦1.0 | 34–36 | ≦0.1 | ≦0.01 | ≦0.01 | ≦0.01 | ≦0.01 | ≦0.01 | " | 135–190 |
| 3 | ≦2.4 | 1.0–2.8 | ≦1.0 | 34–36 | 2.0–3.0 | ≦0.01 | ≦0.01 | ≦0.01 | ≦0.01 | ≦0.01 | " | 145–200 |
| 4 | 2.07 | 2.46 | ≦0.01 | 38.7 | ≦0.01 | ≦0.01 | ≦0.01 | ≦0.01 | ≦0.01 | ≦0.01 | 4.6 | 165 | so that it does not adversely influence a thermal deformation. The corrosion resistance of the workpiece table 15 becomes a problem because the table is dipped in the machining fluid, but long-time reliance is ensured if the table is covered with a rust proofing film such as an organic coating film, a metal film or a ceramic film.

The surface layer formed on the surface of the workpiece table modified by nitriding and boridation, as mentioned at the above (c), will now be described. When the surface layer is formed by nitriding the table surface, iron nitride ($Fe_2N$, $Fe_3N$, $Fe_4N$) is formed to a thickness of 30–200 $\mu$m at a processing temperature of about 500° C. When the surface layer is formed by boridation of the table surface, iron boride (FeB, $Fe_2B$) is formed to a thickness of 10–50 $\mu$m at a processing temperature of about 800° C. The above iron nitride and iron boride both have enough hardness as the surface layer of the workpiece table on which a workpiece is placed. Also, in these cases, the workpiece table need to be protected by a rust proofing film such as an organic coating, metal or ceramic film.

In addition, the formation of a surface layer by the surface coating named at the above (d) will now be described. The surface layer is formed on the workpiece table to a thickness of 5 $\mu$m or more using a method such as a physical or chemical vapor deposition or flame coating of carbide (such as TiC) type, nitride (such as $Si_3N_4$) type, oxide (such as $Al_2O_3$) type or boride (such as $CrB_2$) type ceramic. In this case, the surface layer has enough hardness and no rust proofing process is needed.

Now, concrete examples will be described.

Example 1

The workpiece table 15 on which a workpiece 3 is placed is made of low thermal expansion cast iron consisting of 35% of Ni, 2.4% of C, 1.5% of Si, 1.0% of Mn, 0.5% of Cu, and 0.1% of Cr. Its coefficient of thermal expansion is $4.0 \times 10^{-6}$/°C., and its hardness is Hv 130. A NiP plated layer having a thickness of 50 $\mu$m is coated as a surface layer 17 on the workpiece table 15. In this Example, the NiP-plated layer 17 has a thickness of 50 $\mu$m, so that it does not influence a thermal deformation. It is processed in a self-reducing non-electrolytic bath, so that the film thicknesses of various portions of the layer exhibit uniform values. The NiP-plated film has corrosion resistance and when the content of P is 8%, the film itself exhibits a hardness of about Hv 500, so that it has enough wear and shock resistance. When the wear and shock resistance is insufficient, the performance of the NiP-plated film is further immproved if it is subjected to heat treatment. For example, if it is processed for one hour at 400° C., the crystal structure becomes $Ni_3P$ and the hardness is improved up to Hv 900 or more.

In the wire electrical discharge machining apparatus having the workpiece table 15 and its surface layer 17 as mentioned above, a deviation of the workpiece table 15 due to heat is restricted and the wear resistance is improved by the surface layer 17.

While the above example shows the use of non-electrolytic Ni plating, it may use any one of Cr and Co or an alloy which mainly contains any one of the Cr and Co except for Ni. A so-called dispersion plating which contains hard particles or self-lubricating particles having a diameter of 10 $\mu$m or less in the single substance or the alloy matrix may also provide a similar effect.

The thickness of the plated layer is suitably 20–100 $\mu$m. It it is 20 $\mu$m or less, it does not perform a function as a surface layer while if it is 100 $\mu$m or more, the plated layer is easy to separate due to its internal stress, so that thickness is improper.

Example 2

The workpiece placing surface of a workpiece table 15 similar to that of Example 1 was scanned by a $CO_2$ laser at an output of 1 KW and at a scanning speed of 0.5 m/min to melt, rapidly cool and solidify the workpiece placing surface, so that the surface was changed to white pig iron. (See FIGS. 2 and 3). The surface layer which was changed to white pig iron was 1 mm thick. Then, the workpiece table was coated with a rust proofing film of an organic paint.

This Example provided a similar effect.

Example 3

The workpiece placing surface of a workpiece table 15 similar to that of Example 1 was scanned by a $CO_2$ laser at an output of 1 KW and at a scanning speed of 1.0 m/min to melt the workpiece placing surface and rapidly cool and solidify the same, so that the surface was changed to white pig iron. (See FIGS. 4 and 5). The surface layer which was changed to white pig iron was 1 mm thick. The workpiece table was coated with a ceramic film as a rust proofing film.

This Example provided a similar effect.

Example 4

The workpiece table 15 was made of low thermal expansion cast iron having a composition of 38.7% of Ni, 2.07% of C, 2.46% of Si, 0.01% of Cr, 0.01% of Cu, 0.01% of Mn, 0.06% of Mg, 0.01% of P, and 0.01% of S. The coefficient of thermal expansion of this iron was $4.6 \times 10^{-6}$/°C., and the hardness was Hv 165. The surface of the table 15 was nitrided at about 500° C. to form an iron nitride layer ($Fe_2N$) having a thickness of 100 $\mu$m. The iron nitride layer was covered with an organic paint for rust proofing purposes.

This Example also provided a similar effect.

Example 5

The composition of the workpiece table 15 was the same as that of Example 4. $Al_2O_3$ which was oxide type ceramic was coated to a thickness of 5 $\mu$m on the table by chemical vapor deposition.

This example also provided a similar effect.

In the above Examples 1–5, the surface layer 17 is required to be provided on only that portion of the surface of the workpiece table 15 on which a workpiece is placed from the standpoint of hardness. However, from the standpoint of corrosiveness, the surface layer extends preferably over the overall surface of the workpiece table 15. Therefore, when a surface layer is formed by modifying the surface of the workpiece table, for example, by nitriding or boridation, or by changing the surface organization to white pig iron, the resulting surface layer has no corrosion resistance, so that it may be provided especially only on the surface of the workpiece table 15 on which a workpiece is placed and other portions of the table surface may be covered only with a rust proofing film.

The composition of the workpiece table 15 is not limited to the above Examples and if the table is made of cast iron having a coefficient of thermal expansion of $6 \times 10^{-6}$/°C. or less, it will provide a similar effect.

The surface layer is not limited to the above Examples. If it has corrosion resistance to a machining fluid, and has a hardness higher than the materials constituting the workpiece table, it will provide a similar effect.

As described above, according to the present invention, the workpiece table is made of cast iron having a coefficient of thermal expansion of $6 \times 10^{-6}/°C$. or less, and a surface layer having corrosion resistance to a machining fluid and having a hardness higher than the materials constituting the workpiece table is provided on the surface of the workpiece table on which a workpiece is placed, so that an inexpensive wire electrical discharge machining apparatus which is capable of cutting a workpiece to dimension with high precision can be provided.

What is claimed is:

1. A wire electrical discharge machining apparatus which cuts to a desired shape a workpiece placed on a workpiece table, using a discharge phenomenon occurring between said workpiece and a wire electrode opposite to said workpiece with an interposing machining fluid in a space therebetween, characterized in that said workpiece table is made of cast iron having a coefficient of thermal expansion of less than $6 \times 10^{-6}/°C$. and that a surface layer is provided on at least a portion of said workpiece table on which a workpiece is placed, said surface layer having corrosion resistance to said machining fluid and having a hardness higher than that of the material constituting said workpiece table.

2. A wire electrical discharge machining apparatus as claimed in claim 1, wherein said workpiece table is made of cast iron having a composition of 30-40 wt% of Ni, 1-3 wt% of C, 1-4 wt% of Si, 10 wt% or less of Co, 5 wt% or less of Cr, 0.5 wt% or less of Cu, 1.5 wt% or less of Mn, and 1 wt% or less of each of Mg, P and S.

3. A wire electrical discharge machining apparatus as claimed in claim 1 or 2, wherein said surface layer is a plated layer which comprises a simple substance of any one of Ni, Cr and Co or an alloy which mainly contains any one of Ni, Cr and Co.

4. A wire electrical discharge machining apparatus as claimed in claim 3, wherein said plated layer contains hard particles having a diameter of less than 10 μm or particles of solid state lubricant.

5. A wire electrical discharge machining apparatus as claimed in claim 3, wherein said plated layer has a thickness of from 20 to 100 μm.

6. A wire electrical discharge machining apparatus as claimed in claim 4, wherein said plated layer has a thickness of from 20 to 100 μm.

7. A wire electrical discharge machining apparatus as claimed in claim 1 or 2, wherein said surface layer has a composition of white pig iron.

8. A wire electrical discharge machining apparatus as claimed in claim 7, wherein said workpiece table is coated with a rust proofing layer.

9. A wire electrical discharge machining apparatus as claimed in claim 1 or 2, wherein said surface layer includes a hardened layer due to nitriding or boridation of the surface of said table.

10. A wire electrical discharge machining apparatus as claimed in claim 9, wherein said workpiece table is coated with a rust proofing layer.

11. A wire electrical discharge machining apparatus as claimed in claim 1 or 2, wherein said surface layer is a coating layer made of a material selected from the group consisting of carbide, nitride, oxide and boride type ceramics.

* * * * *